United States Patent
Kanda et al.

(10) Patent No.: US 7,837,002 B2
(45) Date of Patent: Nov. 23, 2010

(54) ELECTRIC POWER STEERING APPARATUS

(75) Inventors: Naotake Kanda, Yamatokoriyama (JP);
Ken Matsubara, Matsubara (JP);
Shinsuke Terada, Ikoma (JP)

(73) Assignee: Jtekt Corporation, Osaka-shi (JP)

( * ) Notice: Subject to any disclaimer, the term of this patent is extended or adjusted under 35 U.S.C. 154(b) by 274 days.

(21) Appl. No.: 12/117,313

(22) Filed: May 8, 2008

(65) Prior Publication Data
US 2008/0277189 A1 Nov. 13, 2008

(30) Foreign Application Priority Data
May 8, 2007 (JP) .............................. 2007-123696
May 23, 2007 (JP) .............................. 2007-136834

(51) Int. Cl.
*B62D 5/04* (2006.01)
(52) U.S. Cl. ..................................... 180/444
(58) Field of Classification Search .................. 180/443, 180/444, 446
See application file for complete search history.

(56) References Cited
U.S. PATENT DOCUMENTS
6,851,509 B2 * 2/2005 Hayakawa et al. .......... 180/444

2009/0251030 A1 * 10/2009 Fujimoto et al. .......... 310/68 B

FOREIGN PATENT DOCUMENTS
JP 2002302053 A * 10/2002
JP 2003-267233 9/2003

* cited by examiner

*Primary Examiner*—Kevin Hurley
(74) *Attorney, Agent, or Firm*—Oblon, Spivak, McClelland, Maier & Neustadt, L.L.P.

(57) ABSTRACT

It is an object of the present invention to provide an electric power steering apparatus to be small and compact.

The control housing 30 is installed between the motor housing 25 of the electric motor 18 and the gear housing 22. The ECU controlling the electric motor 18 is accommodated in the accommodating room S formed within the control housing 30. The motor housing 25 accommodates the bus bar 45 connected to the coil 44 of the stator 36, and the resolver 40 detecting the rotational position of the rotor 35. The resolver 40 is installed within the bus bar mounting member 262 in inner side of radial direction. The partition 52 is mounted on the control housing 30 and the fixing screw 81 is engaged with the insulating member 84 by the way that the fixing screw 81 is inserted into insulating member 84 from its bottom surface side.

14 Claims, 10 Drawing Sheets

ELECTRIC POWER STEERING APPARATUS

INCORPORATION BY REFERENCE

The present application claims priority under 35 U.S.C. §119 to Japanese Patent Applications No. 2007-123696, filed on May 8, 2007 and No. 2007-136834, filed on May 23, 2007. The contents of these applications are incorporated herein by reference in the entirety.

BACKGROUND OF THE INVENTION

1. Field of the Invention

The present invention relates to an electric power steering apparatus, especially the electric power steering apparatus having a control housing built in the electric power steering apparatus.

2. Description of the Related Art

It is well known that there is an electric power steering apparatus to assist by applying the steering force created by an electric motor to a steering mechanism. Various sensors detect steering states of a steering wheel. By outputs from sensors, a controller controls the electric motor to assist the steering force to the steering mechanism, as shown in Tokkai 2003-267233 for example.

The conventional electric power steering apparatus shown in Tokkai 2003-267233 is equipped a controller accommodated in a control housing. The control housing is mounted on a side of the electric motor outside the electric power steering apparatus.

However, the conventional electric power steering apparatus can not be manufactured as a small apparatus, especially in radial direction of the electric motor, because the control housing is installed on the side of the electric motor.

Further in the conventional electric power steering apparatus shown in Tokkai 2003-267233, the controller has a plurality of electronic parts which are mounted on a square board. The board is fixed by bolts at four corners to the control housing. The bolts are mounted from a side where the electronic parts are mounted on the board.

However, in assembling work of this conventional electric power steering apparatus, required is attention for avoiding interference between the bolt itself or an assembling tool screwing the bolts and the electronic parts mounted on the board.

SUMMARY OF THE INVENTION

In view of the previously mentioned circumstances, it is an object of the present invention to provide an electric power steering apparatus to be small and compact.

It is another object of the present invention to provide an electric power steering apparatus in which a mounting element with the electronic parts is fixed easily.

In order to achieve the above and other objects, one aspect of the present invention provides an electric power steering apparatus mainly including a control housing installed between a transmission housing accommodating a transmission device and a motor housing accommodating said electric motor. Thereby, the control housing is built in the electric power steering apparatus by installing the control housing between the transmission housing and the motor housing so that it can be achieved the small and compact the electric power steering apparatus itself in a diameter direction of the electric motor.

The second aspect of the present invention provides an electric power steering apparatus mainly including the electric motor having a rotating shaft and so on, the rotating shaft is rotatably supported by a pair of bearings mounted on the control housing, and the control housing, the pair of bearings, the rotating shaft and so on are consisted of a control housing unit. Thereby, since the control housing unit is constructed, the control housing, the pair of bearings, the rotating shaft and so on are treated as a whole construction so that a manufacturing method is easy and improved.

The third aspect of the present invention provides an electric power steering apparatus mainly including a first bus bar connecting the electric motor with a driving circuit in the controller, a bus bar mounting member mounting the first bus bar in the motor housing, and a rotational position detecting member detecting a rotational position of the rotor of the electric motor, at least one portion of the rotational position detecting member is installed within said bus bar mounting member in inner side of radial direction. Thereby, since at least one portion of the rotational position detecting member is installed within said bus bar mounting member in inner side of radial direction, the size of whole electric power steering apparatus is small so that the size of the electric power steering apparatus is prevented from being large even though the control housing is installed between the transmission housing and the motor housing.

The fourth aspect of the present invention provides an electric power steering apparatus mainly including a positioning flange mounted on the control housing to position the control housing against the transmission housing along an axial direction of the control housing by being abutted against an end surface of the transmission housing, and a positioning shaft positioning a central axis of the rotating shaft with a central axis of an input shaft of the transmission device by being inserted into a positioning hole formed in the positioning flange and a positioning hole formed in the transmission housing. Thereby, the positioning flange mounted on the control housing is abutted against the flange of the transmission housing so that an axial position of the control housing is positioned precisely against the transmission housing. Since the positioning shaft is inserted into the positioning hole formed in the positioning flange and the positioning hole formed in the transmission housing, it is possible to coincide the rotational shaft of the electric motor with the input shaft of the transmission device connected with the rotational shaft so that there is no electrical loss in power transmission from the electric motor to the transmission device.

The fifth aspect of the present invention provides an electric power steering apparatus mainly including the mounting member being inserted into an elongated hole formed in the motor housing to fix the motor housing to the control housing, and the elongated hole is formed as one arc part of a circle having its center on a central axis of the motor housing. Thereby, since the elongated hole is the arc part of the circle having its center on the center axis of the wall portion, the motor housing is rotatable around the center axis of the wall portion so that the motor housing can be adjusted the rotational position of a stator against a rotor of the electric motor.

The sixth aspect of the present invention provides an electric power steering apparatus mainly including a partition mounted on the control housing to partition the control housing from the motor housing, and a supporting element fixing member fixing the supporting element to the control housing by engaging with the supporting element by the way that the supporting element fixing member is inserted into an inserted hole formed in the partition from a motor housing side. Thereby, since the supporting element fixing member is engaged with a surface where the electronic parts of the supporting element is not mounted, there is no interference between the supporting element fixing member and the electronic parts and between a tool fixing the supporting element fixing member and the electronic parts so that it is easy to fix the supporting element supporting the electronic parts with the control housing.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

A preferred embodiment of an electric power steering apparatus according to the present invention will be described referring to FIG. 1 to FIG. 10.

Figure 1:
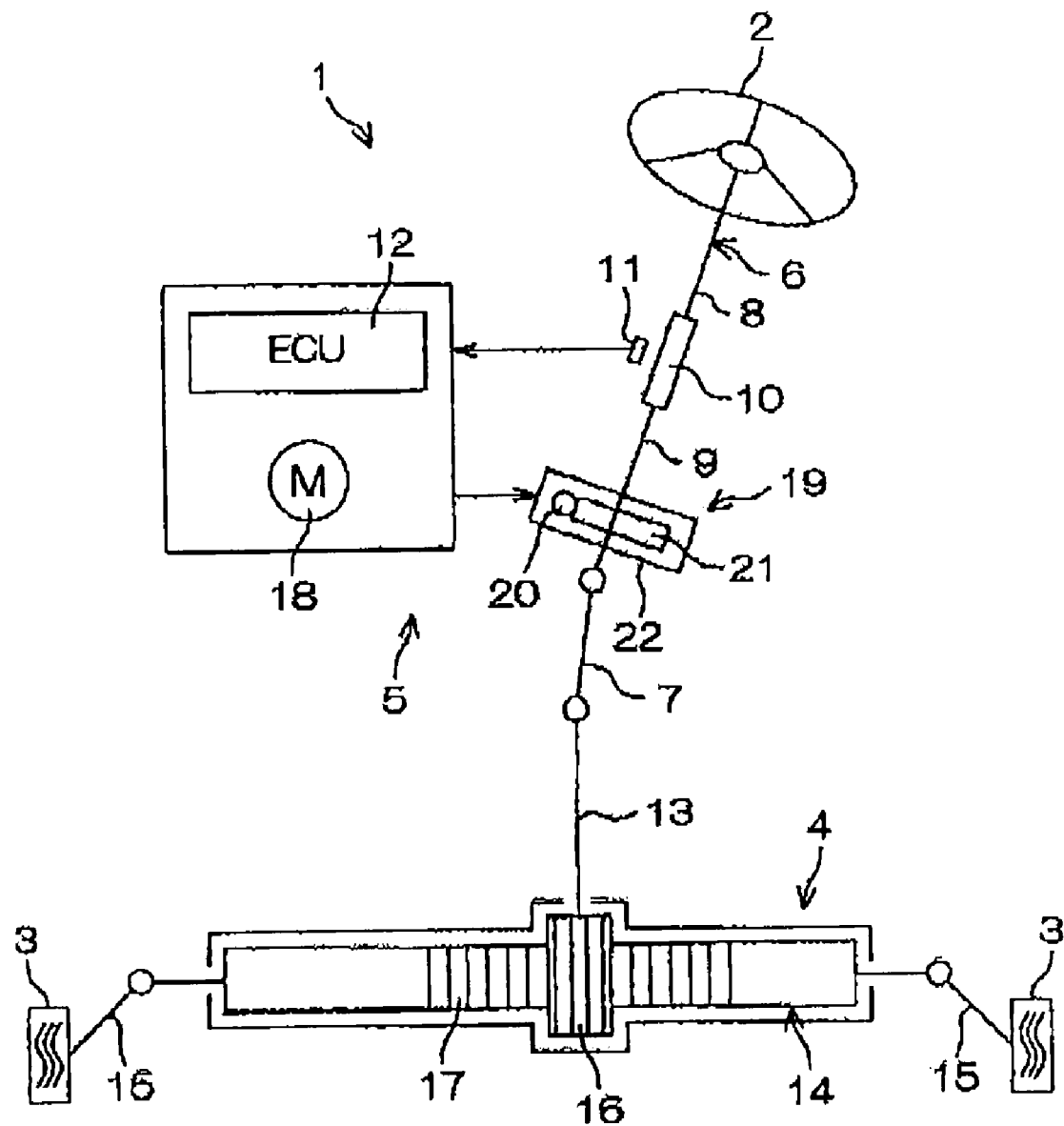
FIG. 1 is a schematic diagram explaining an electric power steering apparatus according to a first embodiment of the present invention.

A first embodiment of an electric power steering apparatus according to the present invention will be described hereinafter referring to FIG. 1 to FIG. 7. FIG. 1 is a schematic diagram explaining the electric power steering apparatus 1. The electric power steering apparatus 1 is equipped with a steering wheel 2 as a steering member steered by a driver, a steering mechanism 4 steering steered wheels 3 according to a rotation of the steering wheel 2, and a steering assist mechanism 5 assisting the steering by the driver. The steering wheel 2 and the steering mechanism 4 are mechanically connected each other through a steering shaft 6 and an intermediate shaft 7. A rotation of the steering wheel 2 is transmitted to the steering mechanism 4 through the steering shaft 6 and the intermediate shaft 7 to be converted into an axial movement of a rack shaft 14. Thereby, the steered wheels 3 are steered. The steering mechanism 4 in this embodiment is a rack-pinion mechanism.

The steering shaft 6 is extended in a straight line. And the steering shaft 6 includes an input shaft 8 connected to the steering wheel 2 and an output shaft 9 connected to the intermediate shaft 7. The input shaft 8 and the output shaft 9 are relatively rotatably connected to be aligned in a line through a torsion bar 10. Therefore, where the steering wheel 2 receives steering torque more than predetermined value, the input shaft 8 and the output shaft 9 are rotated in a same direction with a certain displacement in the rotational direction.

A torque sensor 11 is arranged around a circumference of the steering shaft 6 to detect the steering torque input to the steering wheel 2 based on an amount of the relative rotational displacement of the input shaft 8 and output shaft 9. A result to be detected by the torque sensor 11 is input into an ECU (Electronic Circuit Unit) 12 as a controller. The intermediate shaft 7 connects the steering shaft 6 and the steering mechanism 4.

The steering mechanism 4 includes a pinion shaft 13 and the rack shaft 14. Each end of the rack shaft 4 is connected to each of the steered wheels 3 through each of tie rods 15 and an un-illustrated knuckle arms. The pinion shaft 13 is connected to the intermediate shaft 7. The pinion shaft 13 is rotated in sequential operation with the steering of the steering wheel 2. The pinion 16 is connected with an end, or lower end in FIG. 1, of the pinion shaft 13.

The rack shaft 14 is extended in straight along right and left directions of the vehicle. In a middle portion of the rack shaft 14 is formed a rack 17 engaging in mesh with the pinion 16. The rotational movement of the pinion shaft 13 is converted into the axial movement of the rack shaft 14 by the pinion 16 and the rack 17. The steered wheels 3 are steered by the axial movement of the rack shaft 14.

The steering assist mechanism 5 includes an electric motor 18, and a reduction mechanism 19 as a transmission device to transmit output torque from the electric motor 18 to the steering shaft 6. The reduction mechanism 19 can be used a parallel gear mechanism or a crossed gear mechanism such as a worm gear. In this one embodiment of the present invention, the reduction mechanism is the worm gear. Therefore, the reduction mechanism 19 includes a worm shaft 20 as an input shaft of transmitting device and a worm wheel 21 as the output shaft.

The worm shaft 20 is connected to an un-illustrated rotational shaft of the electric motor 18 through an un-illustrated power transmission coupling. The worm shaft 20 is rotated by the electric motor 18. The worm wheel 21 is connected with the steering shaft 6 to be rotated simultaneously. The worm wheel 21 is rotated by the electric motor 18 through the worm shaft 20.

Based upon the rotation of the worm shaft 20 by the electric motor 18, the worm shaft 20 rotates the worm wheel 21 to rotate the steering shaft 6 simultaneously. The rotation of steering shaft 6 is transmitted to the pinion shaft 13 through the intermediate shaft 7. The rotation of the pinion shaft 13 is converted into the axial movement of the rack shaft 14. Thereby, the steered wheels 3 are steered. Therefore, the steered wheels 3 are steered by the rotation of the worm shaft 20 by the electric motor 18.

The electric motor 18 is controlled by the ECU 12 as the controller. The ECU 12 controls the electric motor 18 in accordance with the torque output result etc. from the torque sensor 11 and the like.

Figure 2:
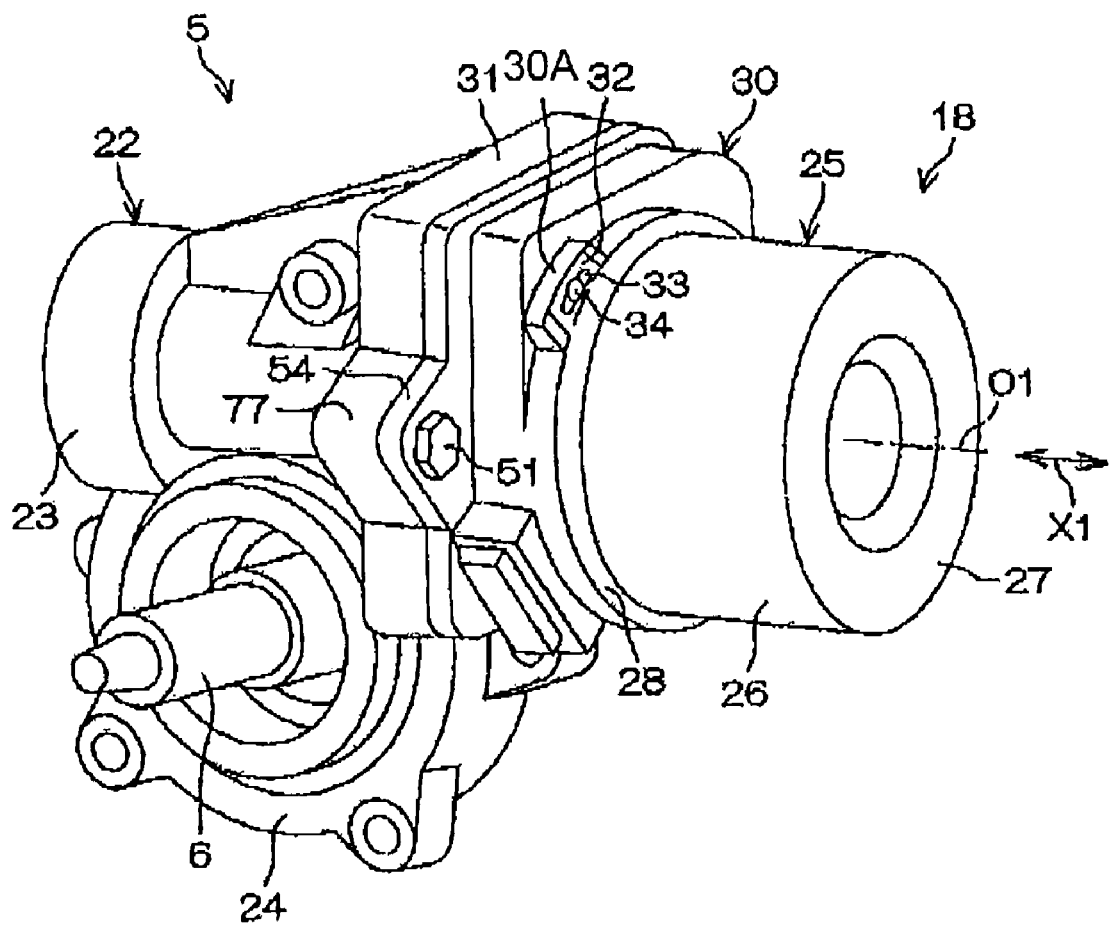
FIG. 2 is an explanatory outline diagram of a steering assist mechanism.

FIG. 2 shows explanatory outline diagram of the steering assist mechanism 5. Referring to FIGS. 1 and 2, the reduction mechanism 19 is accommodated in a gear housing 22 as a transmission housing. The gear housing 22 includes a driving gear accommodating portion 23 accommodating the worm shaft 20 and a driven gear accommodating portion 24 accommodating the worm wheel 21. The steering shaft 6 penetrates through a penetrating hole of the driven gear accommodating portion 24.

The electric motor 18 has a motor housing 25 that is a cup-like shape. The motor housing 25 includes a hollow cylindrical wall portion 26, a bottom portion 27 closed one end of the wall portion 26, and an annular flange 28 extending radially and outwardly from the other end of the wall portion 26. A recess portion 29 is formed in a center of the bottom portion 27 in order to reinforce stiffness of the motor housing 25.

The motor housing 25 is mounted on the gear housing 22 through a control housing 30, that is, the motor housing 25 is mounted on the control housing 30 and control housing 30 is mounted on the gear housing 22. The control housing 30 is installed between the gear housing 22 and the motor housing 25 in order to be built in the electric power steering apparatus 1 so that the whole electric power steering apparatus 1 of the present invention can be small and compact compared to the prior art in which the controller housing is installed outside the electric power steering apparatus. The control housing 30 is attached on a attaching portion 31 of the gear housing 22. And the control housing 30 is positioned adjacent to the electric motor 18 along an axial direction X1 of the electric motor 18.

The gear housing 22 and the control housing 30 are respectively constituted of a light metal such as aluminum alloy so that it is possible for steering assist mechanism 5 to be made light.

Figure 3:
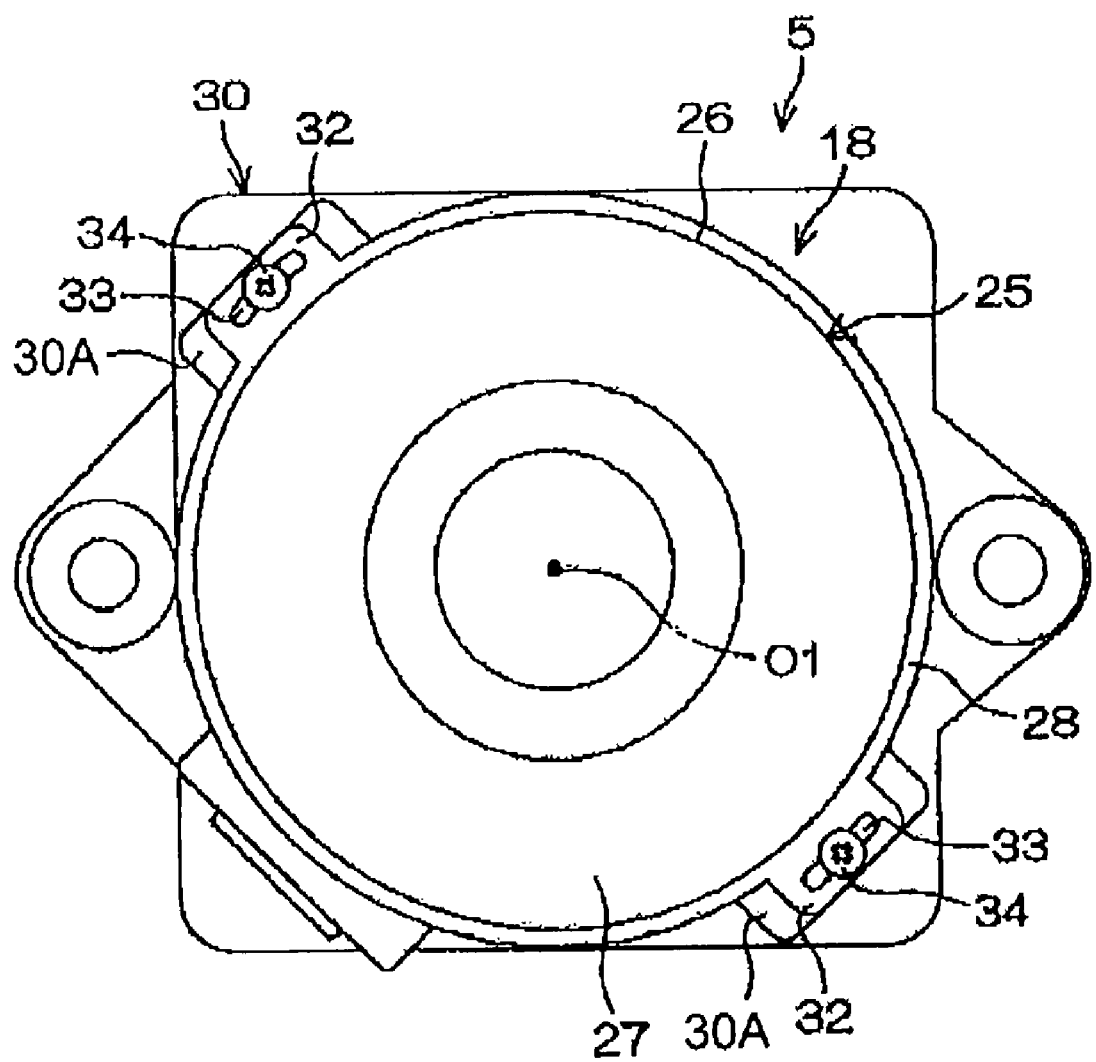
FIG. 3 is a schematic outline diagram showing the steering assist mechanism from a bottom surface side of a motor housing.

FIG. 3 is a schematic outline diagram showing the steering assist mechanism 5 from a bottom surface side. Constructions of the gear housing 22 and the related mechanism are eliminated in FIG. 3.

Referred to FIG. 2 and FIG. 3, a plurality of projecting portions 32, a pair of projecting portions 32 in this one embodiment, are formed on the flange 28 of the motor housing 25. The pair of projecting portions 32 are opposed each other to sandwich the wall portion 26 between them. Each of elongated holes 33 are formed in the projecting portions 32 respectively. The elongated holes 33 are formed as one arc part of a circle having its center on a center axis O1 of the wall portion 26.

On the other hand, the control housing 30 has a pair of mounting steps 30A corresponding to the projecting portions 32. The motor housing 25 is fixed to the control housing 30 with fitting each of projecting portions 32 to each of mounting steps 30A. A pair of mounting bolts 34, as mounting members, fix the motor housing 25 to the control housing 30 in such a manner that the projecting portion 32 is sandwiched between the mounting step 30A and a head of the bolt 34. A shaft portion of each of mounting bolts 34 penetrates through the corresponded elongated hole 33 of the projecting portions 32.

Since the elongated holes 33 of each projecting portion 32 are formed as one part of a circle having its center on the center axis O1 of the wall portion 26, the motor housing 25 is adjustably rotatable within predetermined angles around the center axis O1 of the wall portion 26 in a temporally fixed state to the control housing 30 where the mounting bolts 34 are slightly loosen. Thereby, a rotating position detecting member consisting of a resolver 40 can be adjusted and the resolver 40 will be explained hereinafter referred to FIG. 4.

Figure 4:
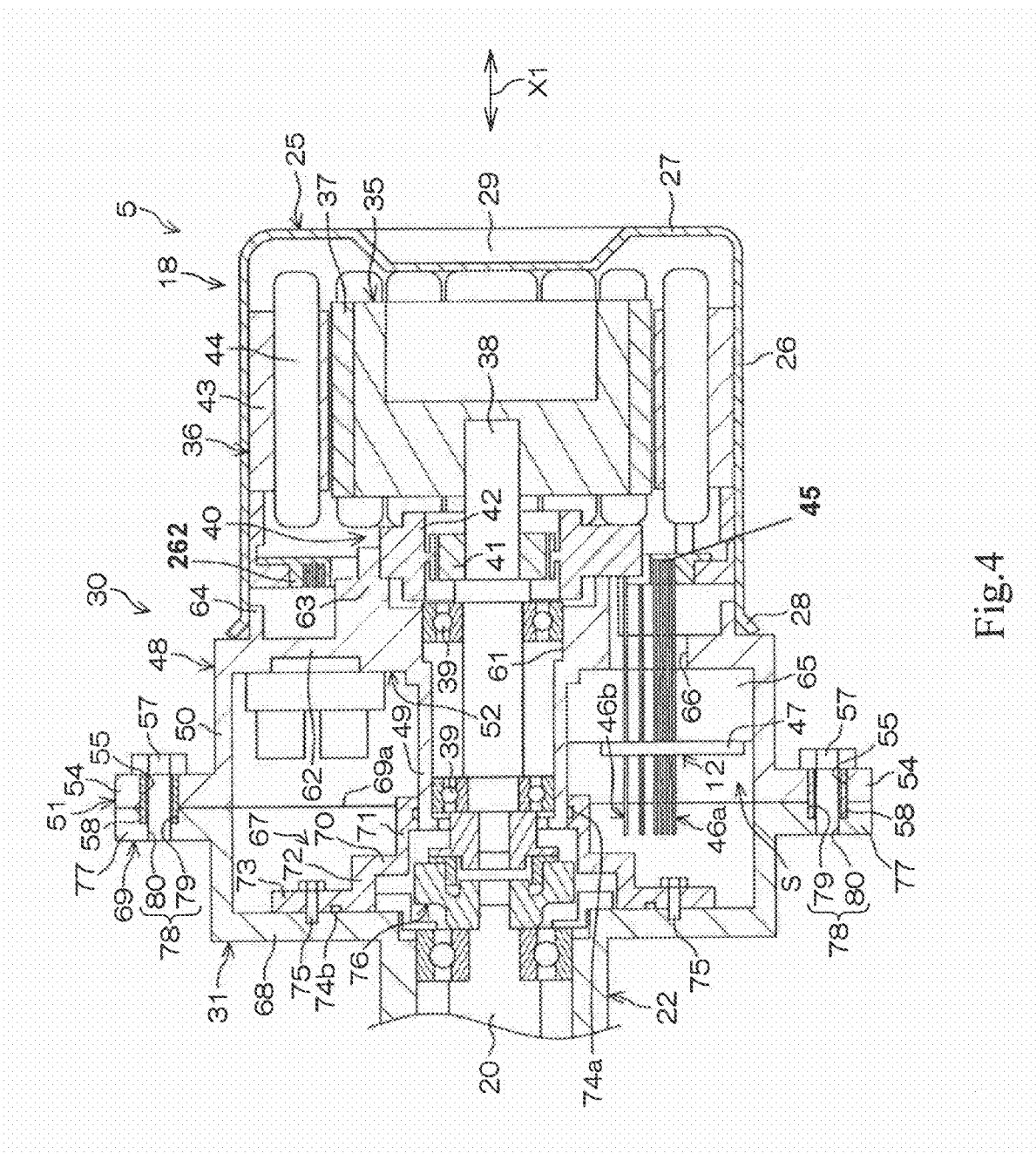
FIG. 4 is a cross sectioned diagram of the steering assist mechanism along an axial direction of an electric motor.

FIG. 4 is a cross sectioned diagram of the steering assist mechanism 5 along the axial direction X1 of the electric motor 18. FIG. 4 shows mainly the cross sectioned diagram of the electric motor 18, the control housing 30 and the mounting portion 31 of the control housing 30.

Referred to FIG. 4, this first embodiment of the present invention uses a brushless motor as the electric motor 18. The electric motor 18 includes the motor housing 25, and a rotor 35 and a stator 36 accommodated in the motor housing 25.

The rotor 35 is annular and has a plurality of permanent magnets 37 on an outer peripheral portion. Magnetic poles are formed on the peripheral portion of the rotor 35 as N-poles and S-poles are alternatively arranged. A rotating shaft 38 is coaxially fixed to the rotor 35 to be able to be rotated together with the rotor 35.

One end of the rotating shaft 38 is projected from the motor housing 25. The rotating shaft 38 is rotatably mounted on the control housing 30 by a pair of bearings 39, 39. The left bearing 39 is supported by an inner surface of a hollow cylindrical portion 49 and the right bearing 39 is supported by a disk portion 62 at a insertion hole 61, whereby the rotor 35 is supported by the control housing 30 through the bearings 39, 39.

A rotating position of the rotor 35 is detected by the resolver 40 as the rotating position detecting member. The resolver 40 includes an annular resolver rotor 41 and an annular resolver stator 42 surrounding the resolver rotor 41. The resolver rotor 41 is fixed on an outer peripheral surface of the rotating shaft 38. The resolver stator 42 is supported by the control housing 30 at a position where the inner surface of the rosolver stator 42 is opposed to the peripheral surface of the resolver rotor 41. Besides, the rotating position detecting member is not limited to the resolver but it may be other detecting device of a rotary encoder and so on. The resolver 40 can detect the rotating position of the rotor 35 by detecting the rotating position of the rotating shaft 38.

The stator 36 includes an annular stator core 43 and coils 44. The stator 36 surrounds the rotor 35. The stator core 43 is fixed on an inner peripheral surface of the of the wall portion 26 of the motor housing 25 at the position that the inner peripheral surface of the stator core 43 faces to an outer peripheral surface of the rotor 35. The stator core 43 is coaxially held on the wall portion 26 of the motor housing 25. The stator core 43 includes annular yoke and a plurality of teeth projecting inwardly from the inner peripheral surface of the yoke. Each end of the coil 44 is wound around each of the teeth.

The coil 44 is connected to an annular first bus bar 45. The bus bar 45 is mounted in plural annular recesses on a control housing side of a bus bar mounting member 262. The bus bar 45 is a distributing member of electric energy from an un-illustrated power supply to each of the coil 44 wound around each of teeth.

Therefore, the coil 44 receives electric power from the power supply through the ECU 12 and the bus bar 45.

An inner diameter of the bus bar mounting member 262 is larger than an outer diameter of the resolver stator 42. And the bus bar mounting member 262 is mounted on an inner surface of the wall portion 26 in a side of not the bottom portion 27 but the flange 28, i.e. between the stator 36 and the flange 28. At least one portion of the resolver 40 is installed within the bus bar mounting member 262 in inner side of radial direction. Thereby, since the resolver 40 is accommodated in the motor housing 25 and installed in the inner side of the radial direction of the bus bar mounting member 262, it is possible to make the electric motor 18 small along the axial direction X1.

The bus bar 45 and the ECU 12 are connected by a pin terminal 46a. And the resolver 40 and the ECU 12 are connected by a pin terminal 46b. The bus bar 45 is directly connected through the pin terminal 46a to a control board 47 of the ECU 12 having a driving circuit, a calculating circuit and so on. The control board 47 is rectangular. The resolver 40 is directly connected to the control board 47 through the pin terminal 46b. The ECU 12 including the control board 47 is accommodated in the control housing 30.

The control housing 30 including the ECU 12 is built in the electric power steering apparatus 1 to be installed between the gear housing 22 and the motor housing 25 and the control housing 30 is adjacent to the electric motor 18 in the axial direction X1 so that it is easy to connect electrically the board 47 and the bus bar 45 without using a wire harness but with using the pin terminal 46a. Thereby a number of parts can be reduced. Since a distance between the board 47 and the bus bar 45 is short, it is possible to reduce an electrical loss between the board 47 and the bus bar 45. Thereby, the power from the power source is efficiently supplied to the electric motor 18.

Figure 5:
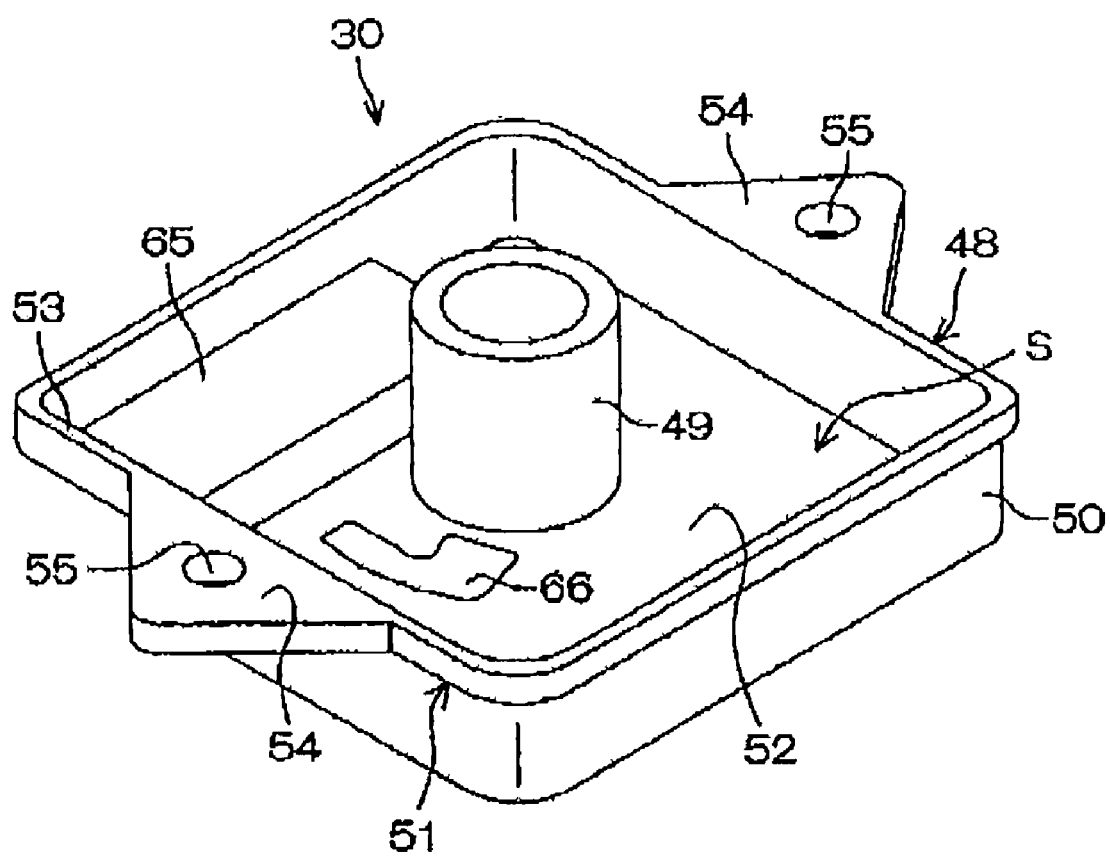
FIG. 5 is a schematic outline of the control housing.

FIG. 5 shows a schematic outline of the control housing 30. Referred to FIG. 5, the control housing 30 is a square box having an open end on its one side. The control housing 30 includes a body portion 48 being square box opened on the one side and a hollow cylindrical portion 49 projecting from the bottom of the body portion 48 to the open end of the body portion 48. The body portion 48 and the hollow cylindrical portion 49 are made with same material in an integral manner. The hollow cylindrical portion 49 has an inner peripheral surface being circular in cross section.

The body portion 48 includes a partition 52 as the bottom of the body portion 48, an outer peripheral wall 50 and a flange 51. The outer peripheral wall 50 is a S square cylinder being a side wall of the body portion 48. The flange 51 is square annular and has a function to be a positioning flange projecting from one end of the outer peripheral wall 50 to outside. The cylindrical portion 49 is extended from a center portion of the partition 52. Between the outer peripheral wall 50 and the hollow cylindrical portion 49 is formed an accommodating room S accommodating the ECU 12.

The partition 52 covers an opening of the motor housing 25 mounted on the control housing 30 so that the partition 52 partitions between the interior of the motor housing 25 and the interior of the control housing 30. Therefore, any dust can be prevented from invading into the interior of the motor housing 25 so that durability of electric motor 18 is improved.

In this first embodiment of the present invention, the control board 47 is square and the accommodating room S is also square in the cross section so that the control board 47 is accommodated in the accommodating room S with good space efficiency, thereby, the control housing 30 is manufactured in a small volume.

An upper end of the flange 51 in FIG. 5 is flat. The flange 51 includes a square annular portion 53 along the end of the outer peripheral wall 50 and a plurality of mounting portions 54, a pair of mounting portions 54 in this embodiment, projecting from the annular portion 53 to outside of the body portion 48. In each of mounting portions 54 is formed a positioning hole 55 penetrating through the mounting portion 54 in a direction of thickness. An inner diameter of the positioning hole 55 is almost equal to an outer diameter of a sleeve 58 explained hereinafter.

Besides, the driving circuit and the control circuit may be installed on each different board respectively. That is, the driving circuit is installed on a power board and the control circuit is installed on a control board, and these boards are accommodated in the accommodating room S1.

Referring to FIG. 4, through each of positioning holes 55 is penetrated the sleeve 58 as a positioning shaft to position the control housing 30 against the gear housing 22. The sleeve 58 is a hollow cylindrical shaft. A shaft portion of a fixing bolt 57 penetrates through inside the sleeve 58, that is, the inner circumference of the sleeve 58 is a bolt penetrating hole being penetrated by the shaft of the fixing bolt 57. An outer diameter of the sleeve 58 is almost equal to an inner diameter of the positioning hole 55. A length of the sleeve 58 is shorter than that of the shaft portion of the fixing bolt 57.

The sleeve 58 is made of a material that has a thermal expansion coefficient same as that of the control housing 30. Thereby, the control housing 30 is precisely positioned against the gear housing 22 without any concern with change of circumferential temperature.

The partition 52 includes the disk portion 62 having the insertion hole 61 in its center, a resolver holder 63 holding the resolver 40, and a motor engaging portion 64 engaging with the motor housing 25. An inner circumference of the hollow cylindrical portion 49 communicates with the insertion hole 61 of the disk portion 62. A central axis of the inner circumferential surface of the hollow cylindrical portion 49 coincides with a central axis of the insertion hole 61. The rotating shaft 38 of the electric motor 18 penetrates through the inner surfaces of the insertion hole 61 and the hollow cylindrical portion 49. On the inner peripheral surfaces of the insertion hole 61 and the hollow cylindrical portion 49 hold respectively each of the bearings 39, 39 supporting rotatably the rotating shaft 38.

The rotating shaft 38 of the electric motor 18 is supported at two points through the pair of bearings 39, 39 by the control housing 30 so that the rotating shaft 38 can be rotated precisely without run-out of its center. Since the rotating shaft 38 is supported at two points, the rotating shaft 38 is steadily held by the control housing 30. The pair of bearings 39, 39 are supported not by the motor housing 22 but by the control housing 30 so that the recess portion 29 can be formed on the bottom portion of the motor housing 22 for reinforcement as previously explained.

The disk portion 62 partitions the interior of the motor housing 22 and the interior of the control housing 30. The disk portion 62 has a mounting step 65 mounting the control board 47 of the ECU 12, and a terminal penetrating hole 66 being penetrated by the pin terminals 46a, 46b. The pin terminals 46a, 46b connected respectively to the bus bar 45 and the resolver 40 are inserted into inside of the control housing 30 through the terminal penetrating hole 66. The pin terminals 46a, 46b inserted into the control housing 30 are directly connected with, by welding or other methods, the control board 47 mounted on the mounting step 65.

The control housing 30 including the ECU 12 is built in the electric power steering apparatus 1 to be installed between the gear housing 22 and the motor housing 25 and the control housing 30 is adjacent to the electric motor 18 so that it is easy to connect electrically the board 47 and the bus bar 45 without using a wire harness but with using the pin terminal 46a and easy to connect electrically the board 47 and the resolver 40 without using a wire harness but with using the pin terminal 46b. Thereby a number of parts can be reduced.

The resolver holder 63 and the motor engaging portion 64 are respectively projected from an outside surface, a right side surface in FIG. 4, of the disk portion 62 to opposite direction to the opening side, a right side in FIG. 4, of the body portion 48. The resolver holder 63 and the motor engaging portion 64 are respectively hollow cylindrical. A diameter of the resolver holder 63 is smaller than that of the motor engaging portion 64 and the resolver holder 63 is positioned inside the motor engaging portion 64. A central axis of the inner peripheral surface of the resolver holder 63 coincides with a central axis of the inner peripheral surface of the hollow cylindrical portion 49. A central axis of the outer peripheral surface of the motor engaging portion 64 coincides with a central axis of the inner peripheral surface of the hollow cylindrical portion 49.

The resolver stator 42 is held on the inner peripheral surface of the resolver holder 63. The inner peripheral surface of an end portion of the wall portion 26 of the motor housing 25 engages with an outer peripheral surface of the motor engaging portion 64.

The control housing mounting portion 31 of the gear housing 22 includes a connecting portion 68 and a flange mounting portion 69. The hollow cylindrical portion 49 of the control housing 30 is connected with the connecting portion 68 through a connecting hollow cylinder 67. The flange 51 of the control housing 30 is mounted on the flange mounting portion 69.

The connecting hollow cylinder 67 includes a hollow cylindrical small diameter portion 71 and a hollow cylindrical large diameter portion 72, and a flange portion 73 projecting from one end of the large diameter portion 72 to outside of a radial direction. The small diameter portion 71 and the large diameter portion 72 are communicated with each other through an annular step 70. An inner diameter of the small diameter portion 71 is almost same as an outer diameter of the hollow cylindrical portion 49 of the control housing 30. The hollow cylindrical portion 49 fits to the inner peripheral surface of the small diameter portion 71. A clearance between the small diameter portion 71 and the hollow cylindrical portion 49 is closed by a seal member 74a such as an O-ring etc. held on the inner peripheral surface of the small diameter portion 71.

The flange portion 73 of the connecting hollow cylinder 67 butts against the connecting portion 68 and is secured by a fixing bolt 75 to the connecting portion 68. Another seal member 74b is held in the flange portion 73 to seal between the flange portion 73 and the connecting portion 68.

A nose of the rotating shaft 38 of the electric motor 18 reaches into the connecting hollow cylinder 67. One end of the worm shaft 20 is positioned inside the connecting hollow cylinder 67. The rotating shaft 38 and the worm shaft 20 are connected by a power transmission coupling 76 inside the connecting hollow cylinder 67 to be able to transmit the power. Thereby, torque is transmitted from the rotating shaft 38 to the worm shaft 20.

The flange 51 of the control housing 30 butts against an end face 69a of the flange mounting portion 69. By the abutment of the flange 51 against the end face 69a of the flange mounting portion 69, the control housing 30 can be positioned in axial direction of the control housing 30 against the gear housing 22. The axial direction of the control housing 30 is same as the axial direction X1 of the electric motor 18 in this first embodiment of the present invention. Therefore, the flange 51 of the control housing 30 performs function as one of the positioning member positioning the control housing 30 against the gear housing 22.

Referring to FIG. 2 and FIG. 4, on the control housing mounting portion 31 is provided with a pair of mounting portions 77 corresponding to the pair of mounting portions 54 of the control housing 30. In each of plural mounting portions 77 is formed with a positioning hole 78 penetrating through the mounting portions 77 in a direction of its thickness. Each positioning hole 78 includes a sleeve fitting portion 79 fit by the sleeve 58, and a screwing portion 80 screwed with the shaft portion of the fixing bolt 57. An inner diameter of the sleeve fitting portion 79 of each positioning hole 78 is set to be almost same as an inner diameter of the positioning hole 55 of the control housing 30, these positioning holes 78 and 55 make a pair.

In a state where the flange 51 of the control housing 30 is butted against the end surface 69a of the flange mounting portion 69 so that the positioning hole 78 of the mounting portion 31 is aligned with the positioning hole 55 of the control housing 30, the sleeve 58 is fitted into the pair of the positioning hole 55 and the sleeve fitting portion 79. Therefore, the control housing 30 is positioned with respect to the gear housing 22 in the direction perpendicular to the axial direction X1 of the electric motor 18. As a result, the rotating shaft 18 of the electric motor 33 and the worm shaft 20 are accurately aligned, whereby loss in power transmission from the electric motor 18 to the worm shaft 20 can be reduced. The sleeve 58 has the function to position the control housing 30 with respect to the gear housing 22.

After the sleeve 58 is fit to the pair of positioning hole 55 and the sleeve fitting portion 79, each of the fixing bolts 57 is inserted into the inner surface of the sleeve 58, and then the fixing bolts 57 are screwed into the screw portion 80 of the positioning hole 78 to fix the control housing 30 against the gear housing 22.

Figure 6:
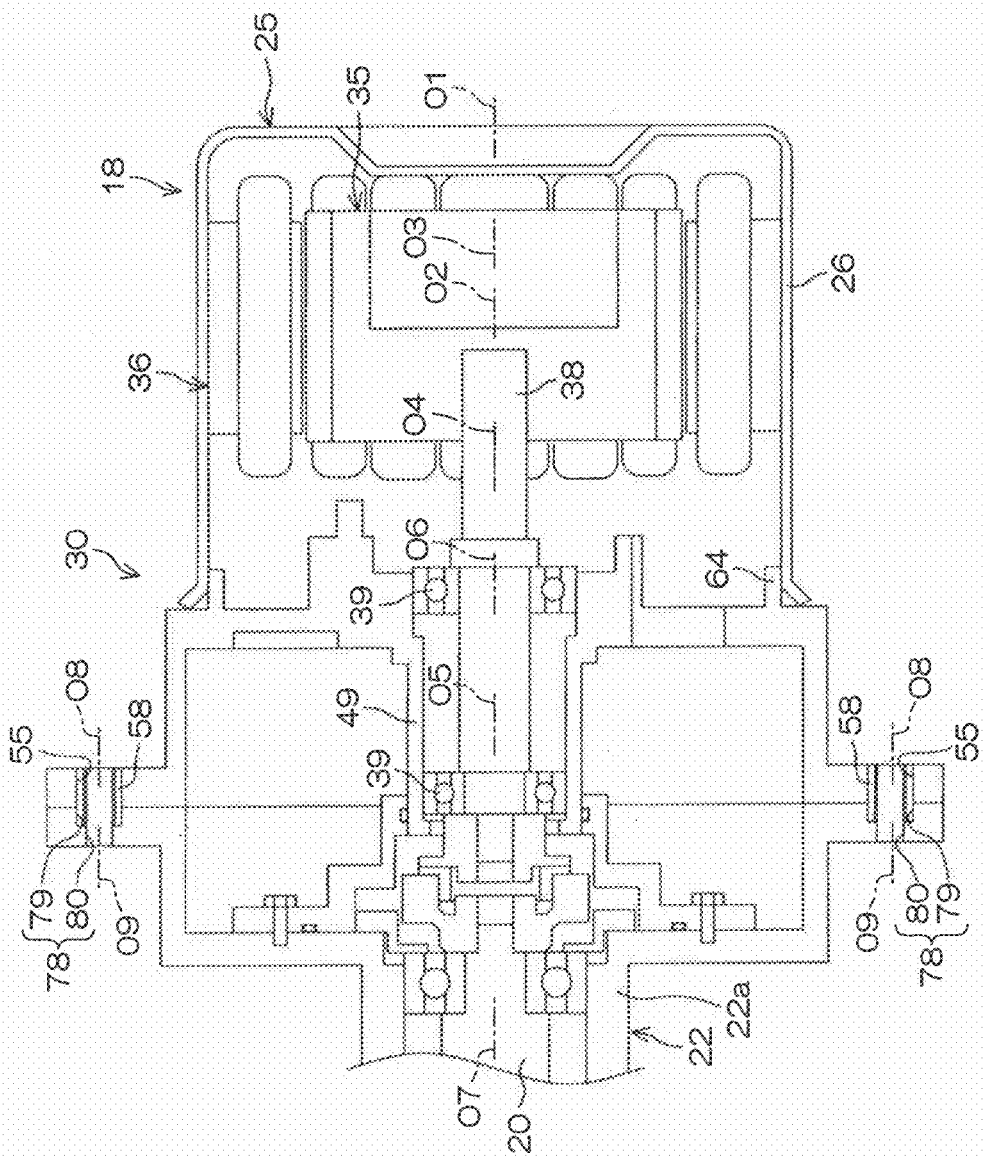
FIG. 6 is a schematic diagram explaining a positioning relationship of the electric motor, the control housing, a gear housing and other relating constructions to these parts.

FIG. 6 is a schematic diagram explaining a positioning relationship of the electric motor 18, the control housing 30, the gear housing 22 and other relating constructions to these parts. FIG. 6 does not show every part to make easy understanding.

Referring to FIG. 6, the central axis O2 of the rotor 35 coincides with the central axis O3 of the stator 36, that is, the central axis O4 of the rotating shaft 38 fixed coaxially to the rotor 35 coincides with the central axis O1 of the wall portion 26 of the motor housing 25 holding coaxially to the stator 36.

In detail, the rotating shaft 38 is rotatably supported by the control housing 30 through the pair of bearings 39, 39 in the state that the central axis O4 of the rotating shaft 38 is coincident with the central axis O5 of the inner surface of the hollow cylindrical portion 49. On the other hand, the motor housing 25 is fixed on the control housing 30 in the state that the central axis O1 of the wall portion 26 is aligned to the central axis O6 of the outer peripheral surface of the motor engaging portion 64 of the control housing 30. Therefore, since the central axis O5 of the inner peripheral surface of the hollow cylindrical portion 49 is coincident with the central axis O6 of the outer peripheral surface of the motor engaging portion 64, the central axis O4 of the rotating shaft 38 is aligned to the central axis O1 of the wall portion 26 of the motor housing 25.

The central axis O4 of the rotating shaft 38 is coincided with the central axis O7 of the worm shaft 20 so that the rotating shaft 38 is precisely aligned to the worm shaft 20. In detail, each positioning hole 55 of the control housing 30 is formed on the control housing 30 in the state that the central axis O8 of the positioning hole 55 is on a peripheral line of a circle, a center of which is coincided with the central axis O5 of the inner peripheral surface of the hollow cylindrical portion 49. On the other hand, the worm shaft 20 is mounted on a hollow cylindrical holding portion 22a of the gear housing 22 and a central axis of an inner peripheral surface of the holding portion 22a is coincided with the central axis O7 of the worm shaft 20. And also, each positioning hole 78 of the gear housing 22 is formed on the gear housing 22 in the state that the central axis O9 of the sleeve fitting portion 79 is on a peripheral line of a circle, a center of which is coincided with the central axis of the inner peripheral surface of the holding portion 22a. Therefore, the sleeve 58 is fit to the pair of the positioning hole 55 of the control housing 30 and the sleeve fitting portion 79 of the gear housing 22 to achieve the coincidence of the pair of the central axis O8 of the positioning hole 55 and the central axis O9 of the sleeve fitting portion 79 so that the central axis O4 of the rotating shaft 38 is aligned to the central axis O7 of the worm shaft 20.

Figure 7:
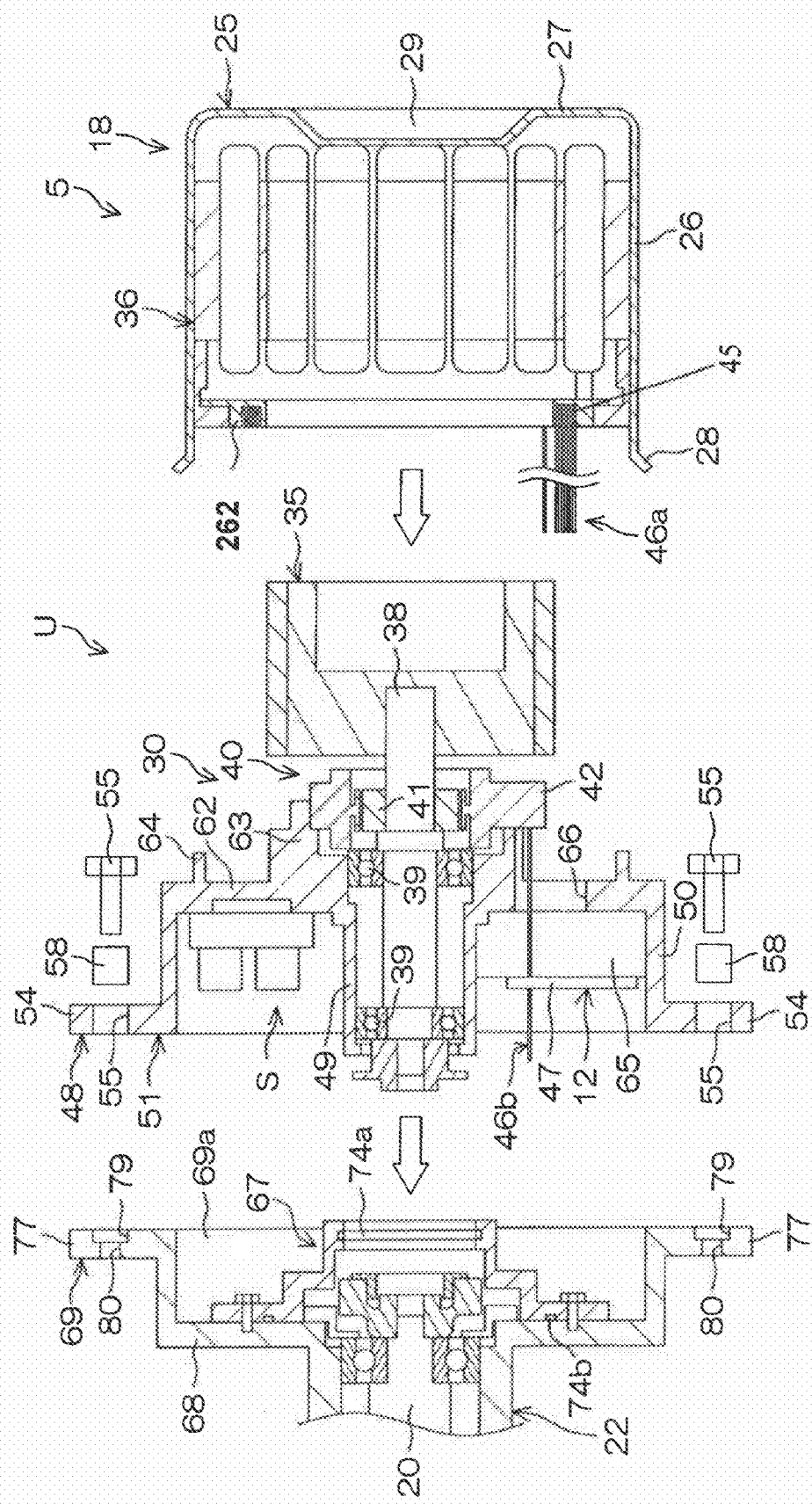
FIG. 7 is a schematic exploded cross diagram of electric motor, the control housing, the gear housing and the related constructions to these parts.

FIG. 7 is a schematic exploded cross diagram of the electric motor 18, the control housing 30, the gear housing 22 and the related constructions to these parts.

Referring to FIG. 4 and FIG. 7, in the one embodiment of the present invention, after assembling the control housing unit U including the control housing 30, the motor housing 25 of the electric motor 18 is fixed to the control housing unit U.

In detail, the ECU 12, the resolver stator 42, the pair of the bearings 39, 39 and the rotating shaft 38 of the electric motor 18 are respectively assembled to the control housing 30, and then the rotor 35 and the resolver rotor 41 are respectively assembled to the rotating shaft 38 of the electric motor 18 to construct the control housing unit U. After that, to the control housing unit U is assembled the motor housing 25 on which the stator 36, bus bar mounting member 262 and the like are mounted.

After completion of assembling control housing unit U, it is easy to treat the unit U assembled by a plurality of parts of the ECU 12 and so on as a whole. Therefore, workability of assembling the steering assist mechanism 5 can be improved.

Besides, it may use un-illustrated assembling jigs to assemble the control housing unit U and the motor housing 25 after each of the control housing unit U and the motor housing 25 is fixed to each of the assembling jigs. By using the assembling jig, the control housing unit U and the motor housing 25 can be steadily assembled without affection of a magnetic force of the rotor 35.

Since the rotating shaft 38 fixed to the rotor 35 is steadily mounted on the control housing 30 through the pair of bearings 39, 39, the rotor 35 can not be moved by its magnetic power to contact with the stator 36.

Referring to FIG. 3 and FIG. 7, after assembling the motor housing 25 to the control housing unit U, the shaft of the mounting bolt 34 is inserted into the elongated hole 33 of each projecting portion 32. The nose of the mounting bolt 34 is screwed into the control housing 30 to fix the motor housing 25 to the control housing 30 temporally.

Because the elongated hole 33 of each projecting portion 32 is the arc part of the circle having its center on the center axis O1 of the wall portion 26, the motor housing 25 is rotatable around the center axis O1 of the wall portion 26 within a certain range. Therefore, the motor housing 25 is rotated around the center axis O1 of the wall portion 26 against the control housing 30 to be able to adjust the rotational position of the stator 36 against the rotor 35.

Since the one embodiment of the present invention can adjust the rotational position of the stator 36 against the rotor 35 during the temporal fixing of the motor housing 25 against the control housing 30, it is no need to rotate relatively the resolver rotor 35 and the resolver stator 42 themselves to adjust a rotational position of the resolver 40. In other words, it can adjust the resolver 40 indirectly by rotating the rotor 35 and the stator 36 relatively.

After the adjustment of the stator 36 against the rotor 35, the mounting bolt 34 is further screwed into the control housing 30 to fully fix the motor housing 25 against the control housing 30.

Besides, the mounting of the control housing unit U against the gear housing 22 may be performed after the motor housing 25 is fixed to the control housing unit U or before the motor housing 25 is fixed to the control housing unit U.

The second embodiment of the electric power steering apparatus according to the present invention will be explained hereinafter based on FIG. 8 and FIG. 9. A numeral in FIGS. 8, 9 having the same numeral in FIGS. 1-7 is the same member and function so that these are not explained.

Figure 8:
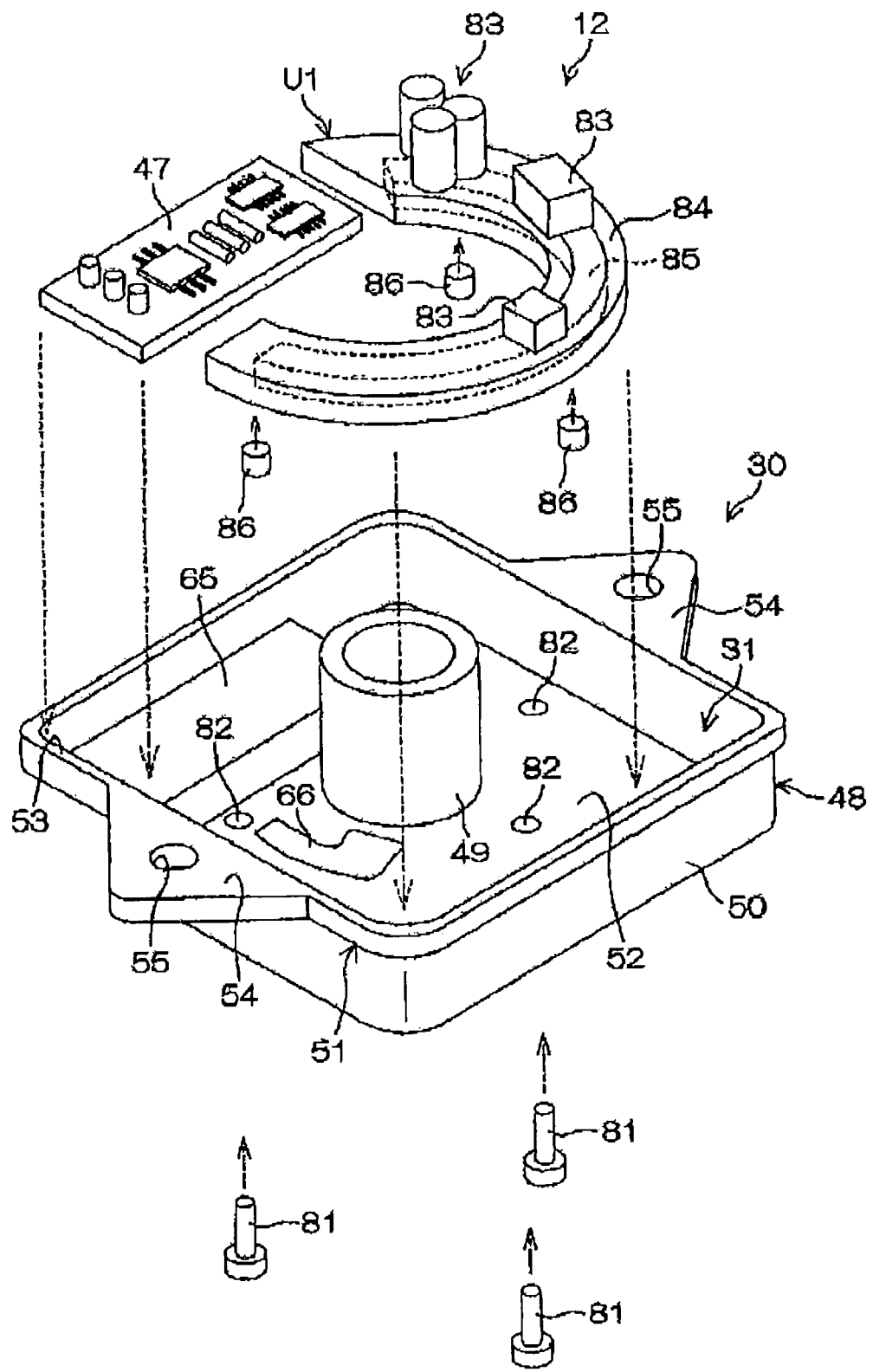
FIG. 8 is a schematic diagram of an ECU and a control housing of the electric power steering apparatus according to a second embodiment of the present invention.
Figure 9:
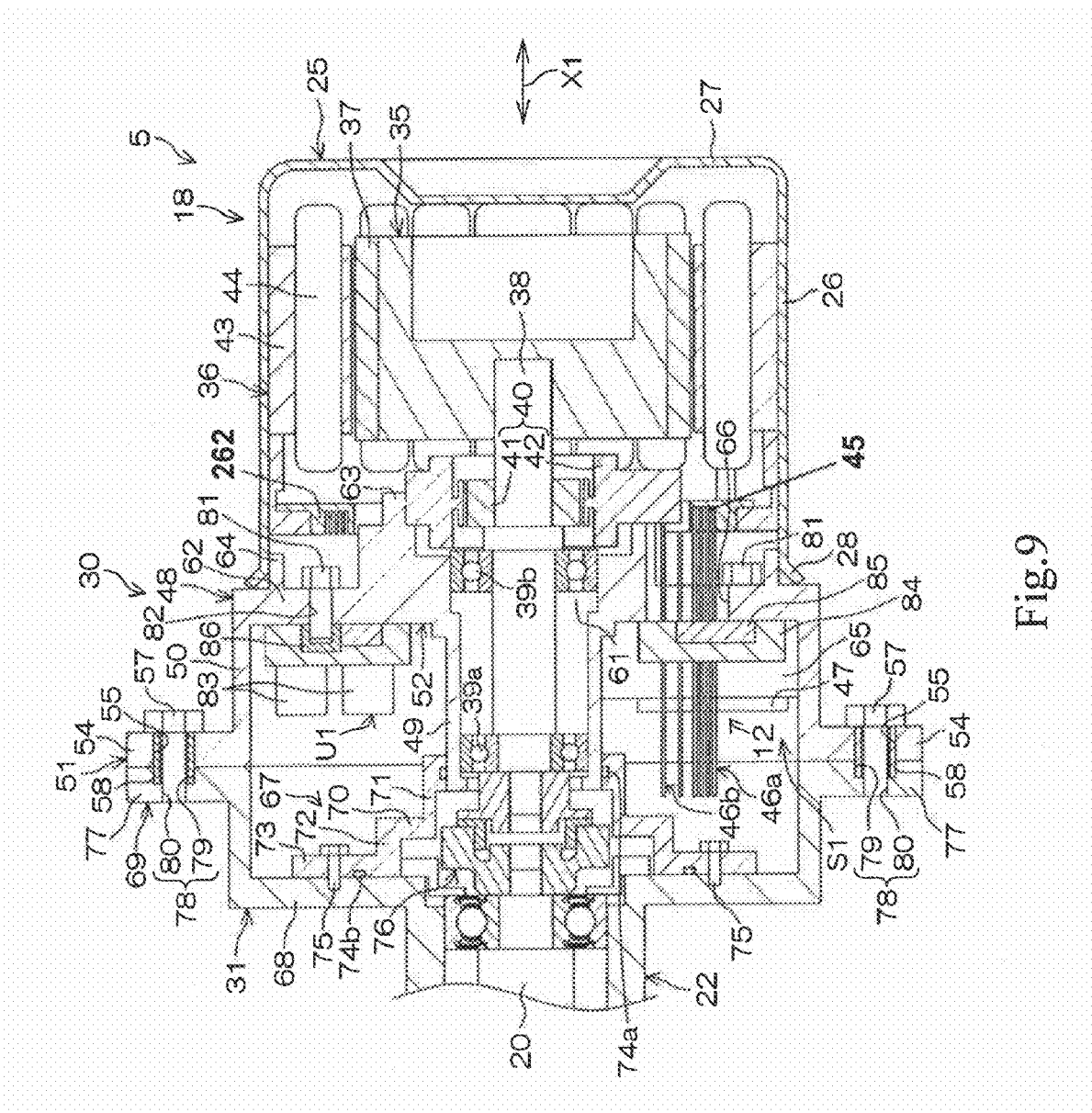
FIG. 9 is a cross sectioned diagram of a steering assist mechanism along an axial direction of the electric motor according to the second embodiment.

Referring to FIGS. 8, 9, the disk portion 62 of the partition 52 of the control housing 30 has a plurality of screw inserted holes 82 through which each shaft portion of the plural fixing screws 81 is inserted. These screws 81 secure on the disk portion 62 an insulating member 84 as a supporting element. A plurality of electronic parts 83 are supported on the insulating member 84. The insulating member 84 is a member of a plate of letter C seen in a plane and consists of synthetic resin. All of the plural electronic members 83 are mounted on one surface (front side) of the insulating member 84. Each of electronic members 83 mounted on the insulating member 84 is electrically connected with a second bus bar 85 implanted in the insulating member 84. The plural electronic members 83 and the insulating member 84 are constructed as a control unit UI adaptable to any control housing having a different specification.

The insulating member 84 is fixed on the control housing 30 in a state that it is installed in the accommodating room S1. That is, the plural fixing screws 81 fix the insulating member 84 to the disk portion 62. The shaft portion of the each fixing screw 81 is inserted from a side of motor housing 25 to be screwed into an implanted nut 86 implanted in a back side of the insulating member 84 so that the plural fixing screws 81 function as a supporting element fixing member to fix the insulating member 84 to the control housing 30.

The insulating member 84 is fixed on the disk portion 62 with surrounding hollow cylindrical portion 49 and without any interference with the mounting step portion 65. In this second embodiment, after the plural electronic members 83 are fixed on the insulating member 84, the insulating member 84 is fixed on the control housing 30. And, after the insulating member 84 is fixed on the control housing 30, the motor housing 25 is fixed on the control housing 30.

The bus bar 85 and the plural implanted nut 86 are implanted in the insulating member 84 by an insert forming. A screw hole of each implanted nut 86 is a blind hole opening to the back surface of the insulating member 84.

Besides, the insulating member 84 may be consisted of other insulating material than the insulating synthetic resin. The shape of the insulating member may be other shape suitable for accommodation in the room S1, for example annular, circular, polygonal, cylindrical shape, than the letter C shape. The implanted nut 86 is implanted in the insulating member 84 to be screwed by the fixing screw 81 in this second embodiment, however, it may be that a screwing hole is formed in the insulating member 84 and the shaft portion of the fixing screw 81 is screwed into the screwing hole of the insulating member 84.

While the invention has been described in detail with reference to the preferred embodiment, it will be apparent to those skilled in the art that the invention is not limited to the present embodiments, and that the invention may be realized in various other embodiments within the scope of the claims.

For example, the column assisted electric power steering apparatus has been described in the one embodiment of the present invention, it is applicable for the other type of electrical power steering apparatus such as pinion assisted electrical power steering or rack assisted electrical power steering apparatus and so on.

The brush-less motor has been described as the electric motor 18 in the one embodiment of the present invention, it is applicable for the other type of electrical motor other than the brush-less motor.

Figure 10:
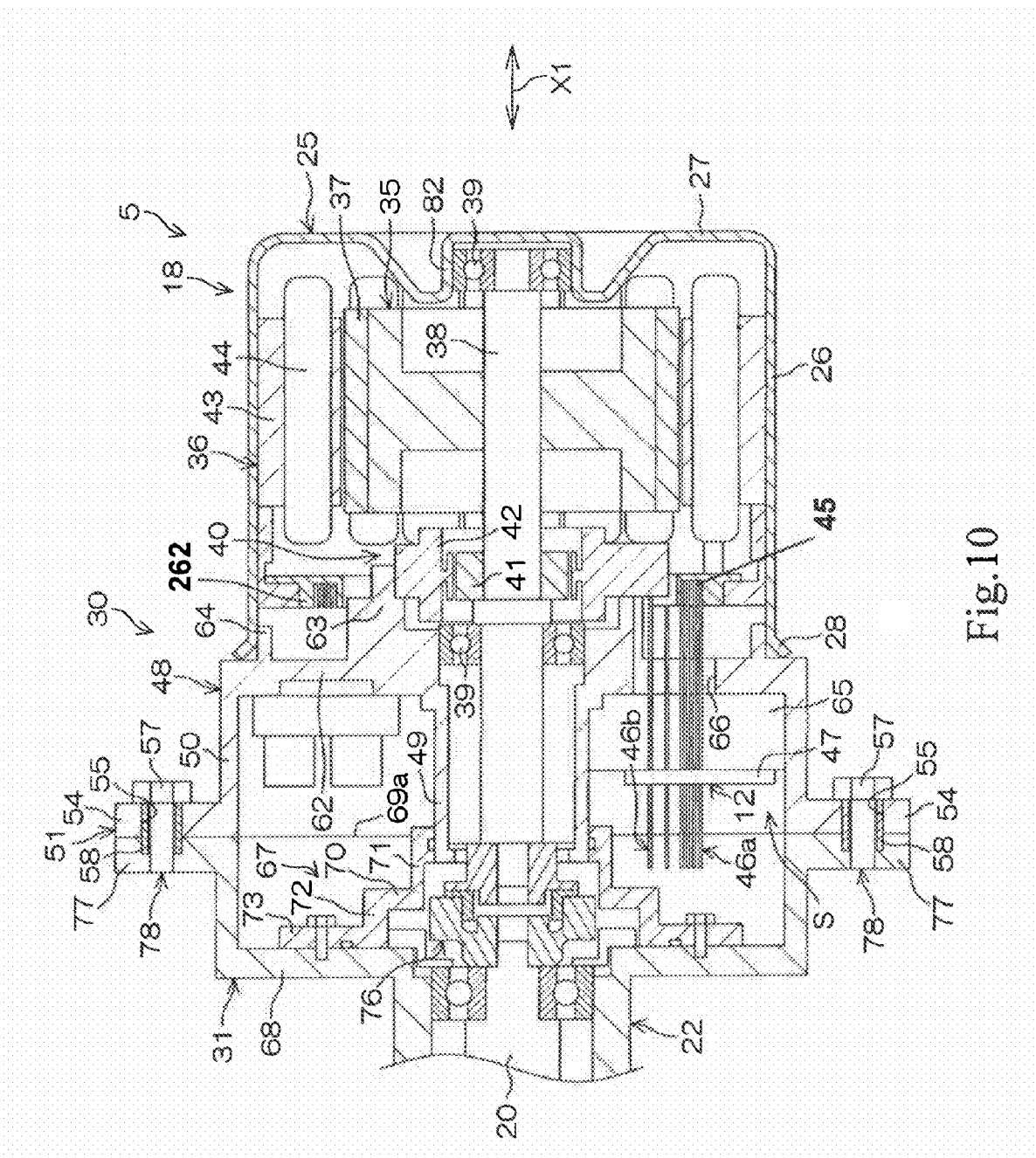
FIG. 10 is a schematic diagram explaining an electric power steering apparatus according to another embodiment of the present invention.

The one embodiment of the present invention has described that the pair of bearings 39, 39 is supported by the hollow cylindrical portion 49 of the control housing 30, however one of the pair of bearings 39, 39 may be supported by the motor housing 25, for example, in FIG. 10 a bearing supporting portion 82 is mounted on the bottom portion 27 of the motor housing 25 and the one of the pair of the bearings 39, 39 is supported by the bearing supporting portion 82.

What is claimed is:

1. An electric power steering apparatus comprising;
    a controller controlling an electric motor for a steering assist;
    a control housing installed between a transmission housing accommodating a transmission device and a motor housing accommodating said electric motor, said control housing accommodates said controller;
    a mounting member mounting said motor housing to said control housing; and
    a positioning member positioning said control housing against said transmission housing.

2. An electric power steering apparatus according to claim 1, wherein
    said electric motor includes a rotating shaft, an annular rotor supported by said rotating shaft and is rotated with said rotating shaft, and an annular stator surrounding said rotor to be fixed on said motor housing,
    said rotating shaft is rotatably supported by a pair of bearings mounted on said control housing, and
    said control housing, said pair of bearings, said rotating shaft, said rotor and said controller constitute a control housing unit.

3. An electric power steering apparatus according to claim 2, wherein said control housing has an outer peripheral wall of a square cylinder, and an accommodating room accommodating said controller within said outer peripheral wall.

4. An electric power steering apparatus according to claim 1, wherein said electric power steering apparatus further comprising;
    a first bus bar connecting said electric motor with a driving circuit in said controller;
    a bus bar mounting member mounting said first bus bar in said motor housing; and
    a rotational position detecting member detecting a rotational position of a rotor of said electric motor, at least one portion of said rotational position detecting member is installed within said bus bar mounting member in inner side of radial direction.

5. An electric power steering apparatus according to claim 4, wherein said first bus bar is connected with said controller by a pin terminal directly and said rotational position detecting member is connected with said controller by another pin terminal directly.

6. An electric power steering apparatus according to claim 1, wherein said positioning member includes;
    a positioning flange mounted on said control housing to position said control housing against said transmission housing along an axial direction of said control housing by being abutted against an end surface of said transmission housing; and
    a positioning shaft positioning a central axis of said rotating shaft with a central axis of an input shaft of said transmission device by being inserted into a positioning hole formed in said positioning flange and a positioning hole formed in said transmission housing.

7. An electric power steering apparatus according to claim 6, wherein said positioning shaft includes a hollow shaft having a bolt inserted hole, and said control housing is fixed to said transmission housing by a fixing bolt inserted into said bolt inserted hole of said hollow shaft.

8. An electric power steering apparatus according to claim 1, wherein said mounting member is inserted into an elongated hole formed in said motor housing to fix said motor housing to said control housing, and said elongated hole is formed as one arc part of a circle having its center on a central axis of said motor housing.

9. An electric power steering apparatus according to claim 1, wherein said control housing includes;
    a supporting element accommodated in said control housing to support at least one of electronic parts of said controller;
    a partition mounted on said control housing to partition said control housing from said motor housing; and
    a supporting element fixing member fixing said supporting element to said control housing by engaging with said supporting element by the way that said supporting element fixing member is inserted into an inserted hole formed in said partition from a motor housing side.

10. An electric power steering apparatus according to claim 9, wherein said supporting element includes an insulating member mounting thereon a second bus bar connecting said electronic parts of said controller each other.

11. An electric power steering apparatus according to claim 10, wherein said insulating member is a synthetic resin.

12. An electric power steering apparatus according to claim 11, wherein said electronic parts and said supporting element are adaptable to a different specification of said control housing.

13. An electric power steering apparatus comprising;
    a controller controlling an electric motor for a steering assist;
    a control housing installed between a transmission housing accommodating a transmission device and a motor housing accommodating said electric motor, said control housing accommodates said controller;
    said electric motor includes a rotating shaft, an annular rotor supported by said rotating shaft to be rotated with said rotating shaft, and an annular stator surrounding said rotor to be fixed on said motor housing;
    a pair of bearings mounted on said control housing to rotatably support said rotating shaft;
    a first bus bar connecting said electric motor with a driving circuit in said controller;
    a bus bar mounting member mounting said first bus bar in said motor housing;
    a rotational position detecting member detecting a rotational position of said electric motor, at least one portion of said rotational position detecting member is installed within said bus bar mounting member in inner side of radial direction;
    a pin terminal connecting said first bus bar with said driving circuit directly;
    an another pin terminal connecting said first bus bar with said rotational position detecting member;
    a mounting member mounting said motor housing to said control housing;
    a positioning member positioning said control housing against said transmission housing;
    said positioning member includes a positioning flange mounted on said control housing to position said control housing against said transmission housing along an axial direction of said control housing by being abutted against an end surface of said transmission housing; and
    a positioning shaft positioning a central axis of said rotating shaft with a central axis of an input shaft of said transmission device by being inserted into a positioning hole formed in said positioning flange and a positioning hole formed in transmission housing.

14. An electric power steering apparatus comprising;
a controller controlling an electric motor for a steering assist;
a control housing installed between a transmission housing accommodating a transmission device and a motor housing accommodating said electric motor, said control housing accommodates said controller;
said electric motor includes a rotating shaft, an annular rotor supported by said rotating shaft to be rotated with said rotating shaft, and an annular stator surrounding said rotor to be fixed on said motor housing,
a pair of bearings mounted on said control housing to rotatably support said rotating shaft;
a supporting element accommodated in said control housing to support at least one of electronic parts of said controller;
said supporting element includes an insulating member mounting thereon a second bus bar connecting said electronic parts of said controller each other;
a partition mounted on said control housing to partition said control housing from said motor housing; and
a supporting element fixing member fixing said supporting element to control housing by engaging with said supporting element by the way that said supporting element fixing member is inserted into an inserted hole formed in said partition from a motor housing side.

* * * * *